E. MOSMAN.
AUTOMATICALLY LOCKING PLATE.
APPLICATION FILED JAN. 24, 1912. RENEWED SEPT. 28, 1912.
1,045,058.
Patented Nov. 19, 1912.
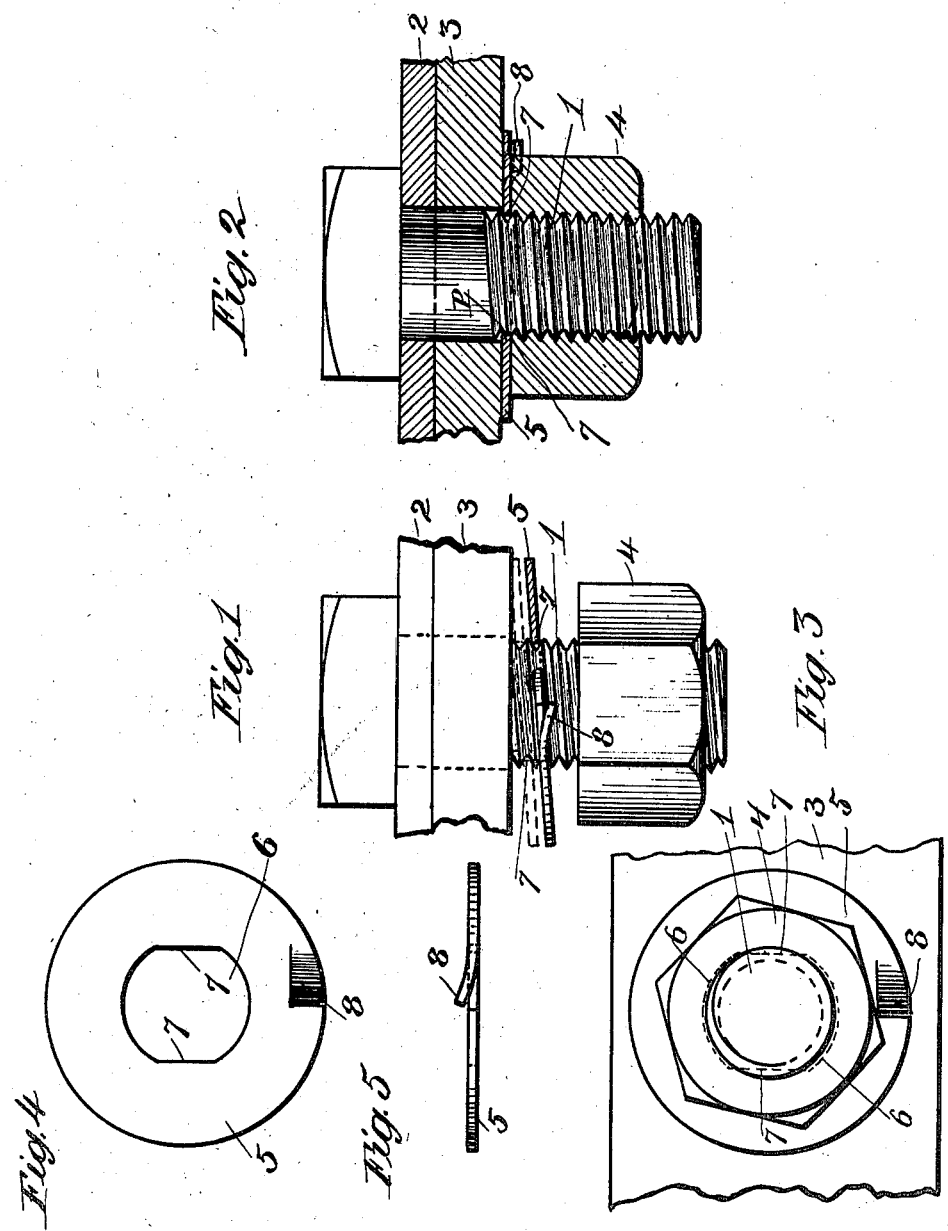

UNITED STATES PATENT OFFICE.

ERNEST MOSMAN, OF CLEVELAND, OHIO.

AUTOMATICALLY-LOCKING PLATE.

1,045,058.  Specification of Letters Patent.  Patented Nov. 19, 1912.

Application filed January 24, 1912, Serial No. 673,272. Renewed September 28, 1912. Serial No. 722,979.

*To all whom it may concern:*

Be it known that I, ERNEST MOSMAN, a citizen of the United States, and resident of Cleveland, in the county of Cuyahoga and State of Ohio, have invented certain new and useful Improvements in Automatically-Locking Plates, of which I hereby declare the following to be a full, clear, and exact description, such as will enable others skilled in the art to which it appertains to make and use the same.

The objects of the invention are to provide an automatically acting locking plate or washer for preventing the nut upon the screw threaded end of a bolt from turning after the nut has been tightly screwed down upon the work.

Many varieties of nut locking devices have been manufactured but the vast majority seem to depend upon modifying the bolt, nut, or bolt and nut, but the advantages of this device are that the locking washer is absolutely complete and positive and automatic in action in itself and requires no change in either the bolt or nut with which it is used.

The invention comprises a spring tempered washer, which is screwed upon the end of the bolt and which is provided with a central opening partially circular which clears the tops of the threads but provided with two straight parallel rigid cutting sides adapted to shear away or bend over a portion of one of the screw threads on the bolt at one side when the washer is compressed by the nut, the spring temper giving the requisite hardness and rigidity of material therefor. One of the straight rigid sides of the washer will therefore automatically form and engage a flat sheared surface in the thread and prevent the washer from turning. The washer is also provided with a spring keeper on its margin adapted to engage one of the flat side surfaces of the nut and thus prevent the nut from turning. This keeper is normally bent upward and is pressed down by the nut when it is screwed down on the bolt, thus enabling the nut to pass in one direction but springs up again automatically and engages the side of the nut, and prevents the nut from being released until the keeper is pressed down flat with the body of the washer, The invention is illustrated in the accompanying drawings hereinafter more fully described, and specifically pointed out in the claims.

In the accompanying drawings Figure 1 is a side elevation of the bolt, nut and washer, showing the washer screwed upon the bolt; Fig. 2 is a longitudinal section showing nut and washer screwed down in place against the work; Fig. 3 is a plan view thereof; Fig. 4 is a plan view of the washer; Fig. 5 is a side elevation thereof.

In these views 1 is the bolt, 2 and 3 are parts of the work through which the bolt passes, 4 is the nut, and 5 is a washer which is thin enough to be screwed upon the bolt. This washer is provided with the central partially circular opening 6, just large enough to clear the tops of the threads of the bolt, and the opposite sides 7, 7 of the opening are made straight and parallel and can only be placed upon the bolt by entering the groove therein like a nut.

The position of the washer when screwing it on the bolt will be inclined, as shown in Fig. 1, with the keeper 8 facing toward the nut, and when the washer rests against the work as shown in dotted lines in Fig. 1 only one side will touch the work and the washer will be on an incline corresponding to the incline of the thread, one side being raised above the work. When the nut is screwed down upon the washer the higher side of the washer will be forced down into parallel position with the engaging surface of the nut and the rigid edge 7 in that side and lying in the thread groove in the bolt will shear off or bend over the part of the thread which it engages, thus leaving a flat straight surface P engaged by the rigid side 7, so that the washer cannot be rotated on the bolt, and a positive lock is formed thereby. The nut cannot turn backward since the projecting spring keeper 8 will strike the side of the nut and prevent it from unscrewing. The spring keeper can be depressed and the nut released if required, and the washer can be removed by pressing it out again to its inclined position in the thread groove and unscrewing it from the bolt.

The entire washer is hardened and drawn to a spring temper, such as is given to hack saws, cold chisels, springs, etc., thus giving the shearing sides 7, 7, rigidity and hardness and making the spring keeper 8 automatic in action.

Having described the invention what I claim as new and desire to secure by Letters Patent is:

1. In an automatically acting locking device for the nut on a bolt, a washer adapted to traverse the thread of the bolt, said washer provided with a central opening having parallel rigid sides adapted to enter the groove of the screw thread in the bolt, one of said sides adapted to shear off or bend away a portion of the thread when the nut is tightly screwed down upon said washer, and a spring member upon said washer adapted to engage and prevent the return of said nut.

2. In an automatically acting locking device for a nut upon a bolt, a washer provided with a central opening, the opening having two parallel rigid edges, said parallel edges and washer inclined to follow the groove in said bolt thread, the said washer assuming an inclined position in said groove and one of said edges adapted to shear away or bend over a portion of the thread when the nut is forced into engagement with the washer, and to form a straight engaging edge for the straight edge of the washer, and an integral spring member in the washer adapted to yield when the nut is screwed upon the bolt, but to engage and prevent the return of said nut.

3. In an automatically acting locking washer for a nut upon a screw threaded bolt, the combination of the washer having a central opening, of larger diameter than the bolt, said opening having a portion of less diameter than the bolt, the edges of said reduced portion being rigid and adapted to travel in the groove of the bolt, and thus place the washer in an inclined position on said bolt, one of said edges adapted to form a straight side upon the thread when the nut is forced against it and to engage the same and a spring member on the washer adapted to engage the sides of the nut.

4. An automatically acting locking plate for the nut upon a bolt comprising a plate having a central opening, said opening provided with two opposite edges adapted to traverse the groove in the bolt, one of said edges adapted to form a corresponding edge upon the bolt thread where the nut is screwed down upon the plate, and a spring member upon said plate adapted to yield and pass the nut when the nut is moved in one direction, but to engage and retain the same when the nut is moved in the reverse direction.

5. A locking washer for a nut and bolt comprising a plate provided with an opening, and rigid members in said opening adapted to enter the spiral groove in said bolt and to traverse the same, one of said members being moved out of said groove to form a flat side on the thread of said bolt and to engage the same when the nut is forced against the washer and a retaining means on the washer for said nut.

In testimony whereof, I hereunto set my hand this 17th day of January, 1912.

ERNEST MOSMAN.

In presence of—
  Geo. S. Cole,
  Wm. M. Monroe.